United States Patent [19]

Chuchua

[11] Patent Number: 4,872,653

[45] Date of Patent: Oct. 10, 1989

[54] SHACKLE FOR USE IN LIMITING THE MOVEMENT OF AN END OF A LEAF SPRING IN A WHEELED VEHICLE

[76] Inventor: Brian N. Chuchua, 920 S. Mohler Dr., Anaheim, Calif. 92807

[21] Appl. No.: 180,159

[22] Filed: Apr. 11, 1988

[51] Int. Cl.[4] .......................... B60G 11/12; F16F 1/28
[52] U.S. Cl. .................................... 267/271; 280/718; 267/52
[58] Field of Search ................ 403/117, 113, 112, 91, 403/92, 161; 280/718, 719, 720, DIG. 1; 267/229–247, 36.1, 38–271, 30, 158, 52, 47

[56] References Cited

U.S. PATENT DOCUMENTS

| | | | |
|---|---|---|---|
| 582,492 | 5/1897 | Swan | 267/271 |
| 1,097,353 | 5/1914 | Olson | 267/233 |
| 1,101,432 | 6/1914 | Greiner | 267/30 |
| 1,189,084 | 6/1916 | Foster | 267/30 |
| 1,190,966 | 7/1916 | Sprague | 267/271 |
| 1,289,140 | 12/1918 | Ferris | 267/271 |
| 1,339,779 | 5/1920 | Mohler | 267/233 |
| 1,350,110 | 8/1920 | Oltsch | 267/245 |
| 1,424,475 | 8/1922 | Hesemeier | 267/233 |
| 1,487,427 | 3/1924 | Asbury | 267/271 |
| 1,766,924 | 6/1930 | Moorhouse | 267/260 X |
| 1,827,284 | 10/1931 | Dootson | 267/30 |
| 2,094,088 | 9/1937 | Wood | 267/233 |
| 2,802,663 | 8/1957 | Hovind | 267/271 X |
| 4,125,276 | 11/1978 | Levasseur | 267/270 X |

FOREIGN PATENT DOCUMENTS

| | | | |
|---|---|---|---|
| 512847 | 11/1930 | Fed. Rep. of Germany | 267/262 |
| 569371 | 6/1924 | France | 267/271 |
| 751736 | 3/1933 | France | 267/30 |
| 915402 | 1/1963 | United Kingdom | 267/30 |

Primary Examiner—Douglas C. Butler
Attorney, Agent, or Firm—Price, Gess & Ubell

[57] ABSTRACT

Replacement shackles for holding the front ends of leaf springs used at the front ends of vehicles such as so-called "off road" vehicles can be constructed so as to each include a stop member which is adapted to hit against the frame of such a vehicle to preclude the shackle being rotated to such an extent that the distance between the ends of the spring is shortened to such an extent that the spring carried by the shackle is damaged.

4 Claims, 1 Drawing Sheet

SHACKLE FOR USE IN LIMITING THE MOVEMENT OF AN END OF A LEAF SPRING IN A WHEELED VEHICLE

BACKGROUND OF THE INVENTION

The invention set forth in this specification pertains to a new and improved shackle for use in limiting the movement of an end of a leaf spring in a wheeled vehicle and to a vehicle employing such shackles to mount the front ends of leaf springs which are attached to the front axle of the vehicle.

Virtually everyone is familiar with the fact that various types of motor vehicles are commonly constructed so as to utilize leaf springs to connect an axle of such a vehicle to the chassis or frame of the vehicle. Such springs are normally used to take up or absorb rapid up and down movement of wheels carried by such an axle caused by road conditions or the like in an effort to a tempt to avoid excessive vibrations or shocks being transmitted to the vehicle body. For reasons which are unimportant to an understanding of the present invention torsion bars or coil or leaf springs have been commonly used in conjunction with the front wheels of a vehicle.

In those cases where leaf springs are employed in connecting the front wheels of a vehicle to a vehicle chassis or frame, the springs are normally connected to the front end of the vehicle frame or chassis through the use of shackles so that these springs extend rearwardly generally beneath and along the sides of the frame or chassis. In such constructions, pivots are commonly used to connect the rear or back ends of the springs directly to the chassis. Other pivots are employed at tops of the shackles to connect them to the chassis or frame and further pivots are employed at the bottoms of the shackles to connect them to the springs. The front axle used with springs held in this mannr is normally connected to these springs intermediate to their ends. The front wheels of the vehicle are, of course, carried by the ends of the axle in this type of mechanism.

Vehicles constructed with their front wheels connected to the frame or chassis in the manner indicated in the preceding paragraph are unquestionably utilitarian. Unfortunately, however, a problem has been encountered with vehicles constructed in the noted manner that are specially adapted for so called "off-road" use. Such vehicles are expected to be used under road and ground conditions which are relatively detrimental to such vehicles. The problem involves the fact that the leaf springs employed in such vehicles have been known onto break or bend generally between the rear ends of such springs and the locations where axles are attached to such springs.

BRIEF SUMMARY OF THE INVENTION

Broadly, the present invention is intended to provide structures as hereinafter described which remedy the problem indicated in the preceding discussion. More specifically the invention is intended to solve or rememdy the noted problem through the use of new and improved shackles for supporting the front ends of the leaf springs in a vehicle using a contraction as indicated in the preceding discussion. The invention is intended to provide shackles for the purpose indicated which are comparatively simple to manufacture and install, which are effective in preventing the breakage or bending of leaf springs when they are used in the combination previously discussed, and which can normally be used virtually indefinitely without wearing out.

In accordance with the present invention, certain of these objectives are achieved by providing a shackle for use in limiting the rotation of an end of a leaf spring which comprises: a body having a top end and a bottom end, top and bottom bearing means located on said body adjacent to said top and said bottom ends, respectively, for use in pivotally mounting said shackle, and stop means located on said body for limiting the rotation of said body when it is rotated about the axis of said top bearing by physically engaging a member located adjacent to said shackle.

In accordance with this invention other of these objectives are achieved by providing in the combination of a vehicle frame, two elongated leaf springs located so as to extend rearwardly from adjacent to the front end of said frame along the sides of said frame, first pivot means pivotally connecting the rear ends of said springs to said frame, a shackle means extending between the front end of each of said springs and said frame, each said shackle means having a top end and a bottom end, a second pivot means pivotally connecting the top end of each shackle means to said frame, a third pivot means pivotally connecting the bottom end of each shackle means to the front end of one of said springs, axle means extending between said springs and attached to said springs between the ends of said springs and wheel means for supporting said vehicle carried by said axle means in which the improvement comprises: each of said shackle means being a body having a top end and a bottom end, top and bottom bearing means located on said body adjacent to said top and said bottom ends, respectively, for use in pivotally mounting said shackle, and stop means located on said body for limiting the rotation of said body when it is rotated about the axis of said top bearing by physically engaging said frame.

BRIEF DESCRIPTION OF THE DRAWING

Because of the nature of this invention it is considered that it is best more fully explained by referring to the accompanying drawing in which.

Figure 1:
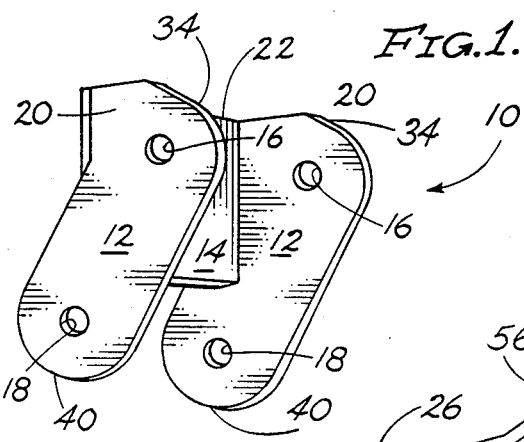
FIG. 1 is an isometric view of a presently preferred shackle in accordance with this invention.

In considering the drawing it should be kept in mind that it is primarily intended for explanatory purposes. It is not intended to indicate any specific structure drawn to a precise scale. The shackles illustrated in it are constructed in accordance with the principles or concepts of the invention as defined in the appended claims. Because such concepts or principles can be easily employed through the use of routine mechanical engineering skill in various differently appearing and differently constructed shackles and because of the fact that such shackles can be employed in somewhat different manners in connection with differently constructed vehicles the invention is to be considered as being limited by these clais and not by the accompanying drawing.

DETAILED DESCRIPTION

In FIG. 1 of the drawing there is shown a presently preferred shackle 10 in accordance with the present invention. Although this shackle 10 can be constructed in a number of different ways in accordance with the present invention, it is considered that it is preferable to construct it by welding together two identical steel side plates 12 and a steel connecting plate 14. These plates 12 and 14 are welded together as illustrated so that the side plates 12 are parallel to one another and are positioned so as to be opposed to and spaced from one another as shown. They are connected by the plate 14; it extends transverse to the plates 12. These plates 12 are provided with aligned top holes 16 and aligned bottom holes 18 or other bearing means so that they may be used as links or shackles as will be subsequently indicated. These plates 12 are also provided with short, beak-like extension members 20 which serve the purpose or function of securely supporting the plate 14 so that an edge 22 of the plate 14 is spaced from the top holes 16. As shown in the embodiment of FIG. 1, the upper edge of the connecting plate 14 may be spaced from the top holes 16 by attaching the connecting plate 14 between the side plates 12 and to the bottom edge of each extension member 20. This spacing is possible because the bottom edge of each extension member 20 (i.e. the edges between which the connecting plate 14 is attached) extends from the side plates 12 at an acute angle with respect to an imaginary line extending between the top hole 16 and bottom hole 18 of each side plate 12.

Figure 2:
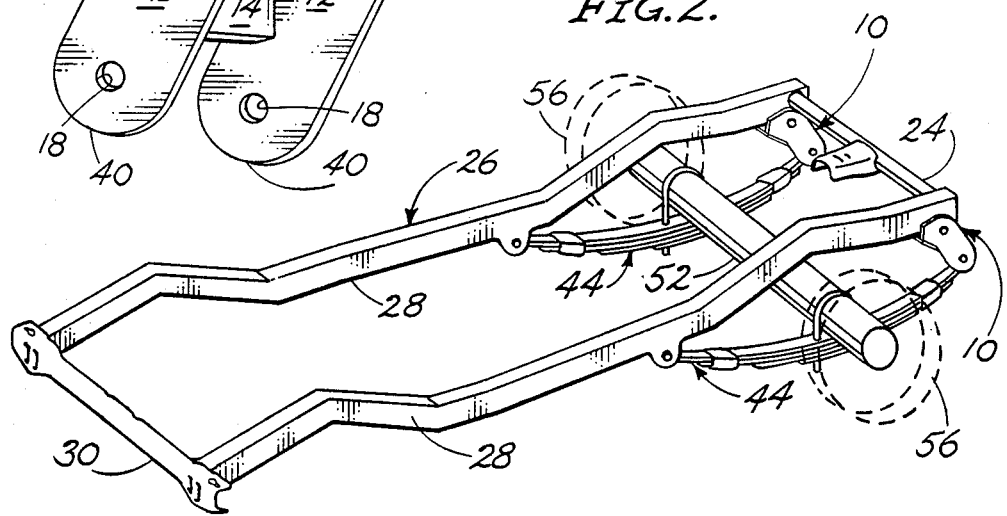
FIG. 2 is an isometric view of a vehicle chassis or frame showing how shackles as illustrated in the preceding FIG. 1 are used in accordance with the invention in mounting leaf springs at the front end of the frame.

In accordance with this invention it is normally intended that two of the shackles 10 be used at the front end 24 of a vehicle frame or chassis 26 as illustrated in FIG. 2 of the drawing. It is to be understood that this frame or chassis 26 can be of any conventional construction. Since the present invention is considered to be of primary utility with comparatively rugged vehicles designed for off-road use in comparatively rough country the frame or chassis 26 will normally be constructed in the conventional manner in which the frame or chassis such a vehicle is constructed. No effort has been made to illustrate any part of a vehicle which includes the frame or chassis 26 a vehicle body, a motor, etc. since such items are not important to an understanding of this invention.

The frame or chassis 26 includes parallel sides 28 and a rear end 30. Small perforate brackets 32 are located on the sides 28 adjacent to the front end 24 so that the upper ends 34 of the brackets 10 can be pivotally secured to the frame or chassis 26 by the use of conventional pivot pins 36 which extend through the holes 16. Other corresponding pivot pins 38 are used in conjunction with the holes 28 to secure the lower ends 40 of these brackets 10 to the front ends 42 of identical, elongated, conventional leaf springs 44. The rear ends 46 of these springs 44 are secured to the frame or chassis 26 along the sides 28 through the use of additional conventional pivots 48 and brackets 50. An axle 52 is also secured to each of the springs 44 in a conventional manner by fasteners 54. Front wheels 56 are normally attached to the axle 52 in a conventional manner.

Figure 3:
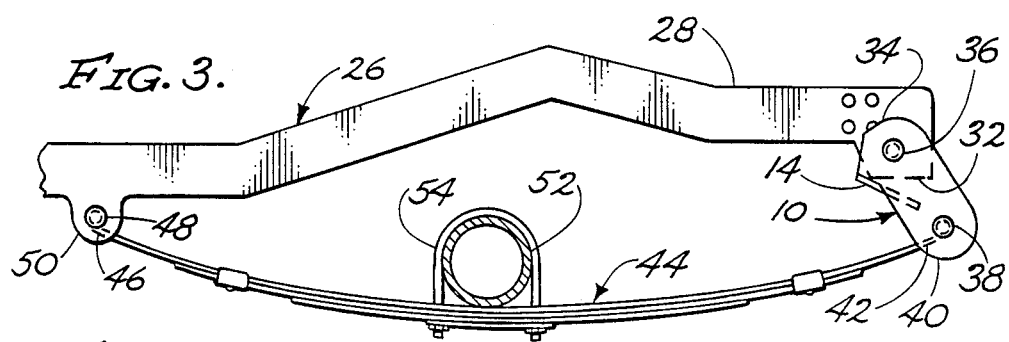
FIG. 3 is a partial side elevational view taken in the direction of the arrow 3 in FIG. 2.

It is noted that the various parts described in the preceding are of such length and that the flexibility of the springs 44 is such that under normal conditions the edge 22 is spaced from the frame 26 a comparatively short distance as is apparent in FIG. 3. Such normal conditions usually prevail when a vehicle is at rest or is going along a comparatively smooth road. When one or both of the wheels 56 hits a significant obstacle (not shown) the impact will normally force the impacting wheel 56 or wheels 56 upwardly and somewhat toward the rear 30 of the frame 26. As this occurs the shackles 10 will pivot about the pins 36 so as to move the plates 14 against the brackets 32. If desired small pads 58 of an impact absorbing material such as known polyurethane pads can be located either on the brackets 32 or on the plates 14 or both to cushion such impact.

As the shackles 10 are pivoting about the pins 36 as noted, concurrently the distance between the ends 42 and 46 will be decreased as a result of the pivots 38 swinging so as to shorten the distance between them and the pivots 48. This will have the effect of forcing the springs 44 to tend to bend or flex to accommodate the lengths of the springs 44 being reduced at their ends are brought toward one another. Normally such bending will tend to occur between the rear ends 46 of such springs and the axle 52. This is considered to be primarily a function of the manner in which the springs 44 are constructed and reinforced by the axles 52 and the fasteners 54.

If such bending or flexibility of the springs 44 intermediate their ends 42 and 46 was allowed to continue to any undesirable extent, these springs 44 would break since there is a limit to the amount that any spring can be bent without being permanently damaged. It is considered that such permanent damage has occurred with the prior use of shackles other than the shackles 10 which have been constructed so as to permit the distance between the ends of a spring to be shortened as a result of shackle rotation past the point that a spring will return to its original configuration.

In accordance with this invention the possibility of such damage is eliminated because of the fact that the plates 14 of the shackles 10 act as stop members or means to limit the amount that a shackle 10 can be rotated to such an extent that the ends 42 and 46 of a spring 44 cannot be moved so closely towards one another that the spring 44 will be bent or deformed to such an extent that it will not return to its original configuration. The shackles 10 are considered to be especially desirable in that they can be easily and conveniently installed on vehicles as replacements for prior art shackles which do not limit spring bending to such an extent as to preclude spring damage.

Figure 5:
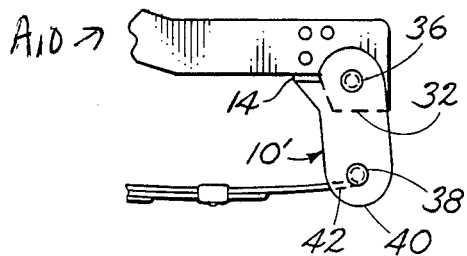
FIG. 5 is a side elevational view corresponding to FIG. 4 showing a modified form of a shackle in accordance with this invention.
Figure 4:
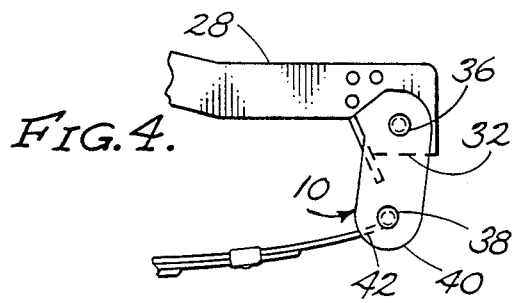
FIG. 4 is a cut-away view corresponding to part of FIG. 3 illustrating the stop action achieved with a shackle in accordance with this invention.

It is believed that it will be apparent to those familiar with the field of the invention that the shackles 10 can be modified in various ways through the use of routine engineering skill without significantly changing the type of action achieved. One such modifiction is indicated in FIG. 5. All parts illustrated in this FIG. 5 are the same as previously described except as specifically indicated herein. In this FIG. 5 there is illustrated a shackle 10' which differs from the shackle 10 only in that it uses a plate 14' which is located in a different position that the plate 14 such that in limiting rotation of the shackle 10' it hits directly against the frame 28 instead of hitting against the brackets 32. As before cushioning material (not shown) can be located either on the plate 14' or the frame 28 or both.

I claim:

1. A shackle for use in limiting the rotation of an end of a leaf spring which comprises:

a body having a top end and a bottom end, top and bottom bearing means located on said body adjacent to said top and said bottom ends, respectively, for use in pivotally mounting said shackle, and stop means located on said body for limiting the rotation of said body when it is rotated about the axis of said top bearing by physically engaging a member located adjacent to said shackle wherein said spring is of such a length that when it is bent as a result of rotation of said shackle said stop means will limit the rotation of said shackle by engaging said frame so as to preclude rotation of said shackle to such an extent that said spring will not be deformed to the extent of being damaged as a result of being bent to accommodate such shackle rotation;

said body comprises two parallel, spaced side plates and a connecting plate located transverse to said side plates and extending between said side plates, said edge being capable of engaging the frame of a vehicle upon which said shackle is used in order to limit rotation of said shackle, and said stop means is an edge on said connecting plate which is spaced from said bearing means.

2. In the combination including a vehicle frame, two elongated leaf springs located so as to extend rearwardly from adjacent to the front end of said frame, first pivot means pivotally connecting the rear ends of said springs to said frame, a shackle means extending between the front end of each of said springs and said frame, each of said shackle means having a top end and a bottom end, a second pivot means pivotally connecting the top end of each shackle means to the front end of one of said springs, axle means extending between said springs and attached to said springs between the ends of said springs and wheel means for supporting said vehicle carried by said axle means, the improvement comprising:

each of said shackle means being a body having a top end and a bottomend, top and bottom bearing means located on said body adjacent to said top and bottom ends, respectively, for use in pivotally mounting said shackle, and stop means located on said body for limiting the rotation of said body when it is rotated about the axis of said top bearing by physically engaging said frame wherein said springs are of such a length that when they are bent as a result of rotation of said shackles said stop means will limit the rotation of said shackles by engaging said frame so as to preclude rotation of said shackles to such an extent that said springs will not be deformed to the extent of being damaged as a result of being bent to accommodate such shackle rotation;

said body comprises two parallel, spaced side plates and a connecting plate located transverse to said side plates and extending between said side plates, said edge being capable of engaging the frame of a vehicle upon which said shackle is used in order to limit rotation of said shackle, and said stop means is an edge on said connecting plate which is spaced from said bearing means.

3. A shackle for use in limiting the movement of an end of a leaf spring attached thereto, comprising:

a body having two substantially parallel, spaced side plates;

bearing means located at the top and bottom of each side plate;

a pair of extension members, each extension member protruding from near the top end of each side plate whereby the bottom edge of each extension member is at an acute angle with respect to an imaginary line extending between the two bearing means located on each side plate; and a connecting plate mounted to the bottom edge of the extension members, whereby the connecting plate is located transverse to the side plates and extends between the side plates at an acute angle with respect to the imaginary line extending between the two bearing means located on each side plate and so that an upper edge of the connecting plate is spaced from the top bearing means so as to stop the movement of the leaf spring when the upper edge of the connecting plate engages a structural member located adjacent to the shackle.

4. The combination as claimed in claim 3 wherein:

said spring is of such a length that when it is bent as a result of rotation of said shackle said upper edge will limit the rotation of said shackle by engaging said structural member so as to preclude rotation of said shackle to such an extent that said spring will not be so deformed as to be damaged as a result of being bent to accommodate such shackle rotation.

* * * * *